United States Patent
Hu et al.

(10) Patent No.: US 11,828,037 B1
(45) Date of Patent: Nov. 28, 2023

(54) PULLOUT RESISTANCE MEASURING DEVICE AND METHOD BASED ON ANCHOR PLATE FOUNDATION OF SUBMARINE SLOPE SITE

(71) Applicant: Zhejiang University City College, Zhejiang (CN)

(72) Inventors: Chengbao Hu, Zhejiang (CN); Bing Li, Zhejiang (CN); Gang Wei, Zhejiang (CN); Yuanjian Zhang, Zhejiang (CN); Yuliang Sai, Zhejiang (CN); Xiaozhen Fan, Zhejiang (CN); Jianying Yu, Zhejiang (CN); Xinsheng Yin, Zhejiang (CN); Huixin Xue, Zhejiang (CN)

(73) Assignee: Zhejiang University City College, Hangzhou (CN)

( * ) Notice: Subject to any disclaimer, the term of this patent is extended or adjusted under 35 U.S.C. 154(b) by 0 days.

(21) Appl. No.: 18/195,355

(22) Filed: May 9, 2023

(30) Foreign Application Priority Data

Jul. 14, 2022 (CN) .......................... 202210823180.8

(51) Int. Cl.
  *E02D 33/00* (2006.01)
  *G01N 3/08* (2006.01)

(52) U.S. Cl.
  CPC .............. *E02D 33/00* (2013.01); *G01N 3/08* (2013.01); *G01N 2203/0017* (2013.01)

(58) Field of Classification Search
  CPC ... G01N 3/08; G01N 2203/0017; E02D 33/00
  See application file for complete search history.

(56) References Cited

U.S. PATENT DOCUMENTS

2021/0003490 A1* 1/2021 Zhao .................. G01N 3/22
2022/0275597 A1* 9/2022 Liu .................... E02D 5/808

FOREIGN PATENT DOCUMENTS

| CN | 101975687 A | 2/2011 |
| CN | 105625486 A | 6/2016 |
| CN | 205958364 U | 2/2017 |
| CN | 207991944 U | * 10/2018 |

(Continued)

OTHER PUBLICATIONS

1st Office Action of counterpart Chinese Patent Application No. 202210823180.8 dated Aug. 30, 2022.

(Continued)

*Primary Examiner* — Jonathan M Dunlap

(57) ABSTRACT

The present invention discloses a pullout resistance measuring device and method based on an anchor plate foundation of a submarine slope site. The measuring device includes a support, a moving beam, a hoisting mechanism, a cylinder device, a pulley assembly, a soil sample, a spiral anchor, a traction rope and a force measuring device, where the moving beam is movably mounted on the support; the hoisting mechanism is movably mounted on the moving beam; the cylinder device includes a cylinder; the pulley assembly is movably mounted on the cylinder corresponding to the vertical slit; the soil sample is filled in the cylinder; the spiral anchor is buried in the soil sample; one end of the traction rope is connected to the hoisting mechanism, and the other end is directly connected to the spiral anchor; and the force measuring device is arranged on the traction rope.

6 Claims, 7 Drawing Sheets

(56) References Cited

FOREIGN PATENT DOCUMENTS

| | | | | |
|---|---|---|---|---|
| CN | 109577383 | A | * | 4/2019 |
| CN | 215004723 | U | * | 12/2021 |
| CN | 215004723 | U | | 12/2021 |
| CN | 113916663 | A | | 1/2022 |
| JP | 2003139673 | A | * | 5/2003 |
| JP | 2003139673 | A | | 5/2003 |
| KR | 101383234 | B1 | | 4/2014 |

OTHER PUBLICATIONS

Notice of Allowance of counterpart Chinese Patent Application No. 202210823180.8 dated Sep. 27, 2022.
Qing Li et al., Experimental and Theoretical Analysis on the Uplift Capacity of Strip Plate Anchor near a Slope, Journal of Railway Science and Engineering, Dec. 2019, pp. 2960-2968, vol. 16, No. 12.

* cited by examiner

PULLOUT RESISTANCE MEASURING DEVICE AND METHOD BASED ON ANCHOR PLATE FOUNDATION OF SUBMARINE SLOPE SITE

CROSS REFERENCE TO RELATED APPLICATIONS

The present application claims the benefit of Chinese Patent Application No. 202210823180.8 filed on Jul. 14, 2022, the contents of which are incorporated herein by reference in their entirety.

TECHNICAL FIELD

The present invention relates to the field of anchor plate tests, in particular to a pullout resistance measuring device and method based on an anchor plate foundation of a submarine slope site.

BACKGROUND

China is a major maritime country, with the ocean area accounting for about one-third of the total land area. The vast sea area has great value in terms of safety, economy, environmental protection, etc. At present, a large number of marine projects, such as offshore platforms, submarine tunnels and cables, are accelerating their layout to the ocean. Anchor plate foundations and pile foundations are widely used in these projects to anchor the superstructure. A lot of research has been currently carried out on pile foundations of various forms and different application scenarios, but the research on anchor plates, a relatively new foundation form, is relatively rare.

As a basis for providing pullout resistance, the geometrical shape of an anchor plate has an important impact on the exertion of the pullout resistance and its pullout failure mode. Typical anchor plate foundations mainly include strip anchor plates, square anchor plates, circular anchor plates and spiral anchor plates. In order to resist the complex marine environment, new types of anchor plate foundations commonly used in marine engineering such as suction anchors, penetration anchors and vertically loaded anchors have been developed currently. These new anchor plate structures are inherited from a spiral anchor, and the pullout bearing characteristics are closer to those of the spiral anchor. Therefore, using the spiral anchor foundation to carry out indoor model tests has become a feasible way to test the pullout resistance of marine anchor plate foundations under different conditions, and to analyze the pullout bearing characteristics of the anchor plates on this basis. At the same time, the exertion of the pullout bearing capacity of marine anchor plates is closely related to the marine geological environment in which the anchor plates are located. A large number of marine exploration results show that the foundation bed at the bottom of the ocean is generally in the form of undulating slopes and valleys, and the distribution of the underlying strata is complex. Due to the difference in stress states of a marine slope site, the pullout bearing capacities and failure modes of the same anchor plate under the action of pulling forces in different directions are usually different. Obviously, an anchor plate pullout test in a horizontal site based on plane assumption is not applicable to the anchor plate foundations of the above-mentioned submarine slope site. Therefore, it is necessary to develop a three-dimensional test device for pullout bearing characteristics of an anchor plate foundation of a submarine slope site, so as to study, under complex submarine slope site conditions, the pulling characteristics of a spiral anchor under different pulling angles and an exertion mechanism thereof.

SUMMARY

In view of the existing technical problems, the present invention provides a pullout resistance measuring device and method by simulating an anchor plate foundation of a submarine slope site, which can simulate the pulling of a spiral anchor at any space angle in a submarine slope site in the space, thereby revealing a damage mode of the spiral anchor at different space pulling angles regarding a soil layer in the submarine slope site and a pullout bearing capacity exerting mechanism of the spiral anchor.

To realize the purpose of the above-mentioned invention, the present invention adopts the following technical solutions:

A pullout resistance measuring device based on an anchor plate foundation of a submarine slope site, including a support, a moving beam, a hoisting mechanism, a cylinder device, a pulley assembly, a soil sample, a spiral anchor, a traction rope and a force measuring device, where the moving beam is mounted on the support and can move along a first horizontal direction relative to the support; the hoisting mechanism is mounted on the moving beam and can move, relative to the moving beam, along a second horizontal direction perpendicular to the first horizontal direction; the cylinder device includes a cylinder with both open ends, and the side of the cylinder facing the hoisting mechanism is provided with a vertical slit; the pulley assembly is mounted on the side wall of the cylinder corresponding to the vertical slit and can move in the vertical direction relative to the cylinder, and the pulley assembly includes a fixed pulley; the soil sample is filled in the cylinder, and the top of the soil sample is arranged in an inclined shape; the spiral anchor is buried in the soil sample; one end of the traction rope is connected to the hoisting mechanism, and the other end is directly connected to the spiral anchor by running through the opening on the top of the cylinder, or connected to the spiral anchor after winding around the fixed pulley and running through the vertical slit; and the central axis of the portion of the traction rope adjacent to the spiral anchor is located on the same straight line as the center point of the cross section of the spiral anchor, and the force measuring device is arranged on the traction rope.

In one of the embodiments, the hoisting mechanism is adsorbed and fixed on the moving beam by means of a hoisting magnetic part, and the length extension direction of the moving beam is the second horizontal direction.

In one of the embodiments, both ends of the moving beam are adsorbed and fixed on the support by means of beam magnetic parts.

In one of the embodiments, the cylinder device further includes a chassis arranged below the cylinder, a positioning groove is defined on the top of the chassis, and the bottom end of the cylinder is rotatably arranged in the positioning groove.

The pullout resistance measuring device based on an anchor plate foundation of a submarine slope site according to the present invention has the beneficial effects as follows: according to the pullout resistance measuring device based on an anchor plate foundation of a submarine slope site according to the present invention, by arranging the cylinder device which includes a bottomless cylinder with both open ends, the spiral anchor is buried in the soil sample placed in the cylinder and the top of the soil sample is composed of at least one inclined surface, and the hoisting mechanism and the spiral anchor are connected by the traction rope. During the test, applying a pulling force to the spiral anchor embedded in the cylinder by winding the traction rope via the hoisting mechanism can realize a pulling simulation of the spiral anchor in the environment of the submarine slope site in the space. By mounting the moving beam on the support and mounting the hoisting mechanism on the moving beam, the moving beam is arranged to move along the first horizontal direction relative to the support, and the hoisting mechanism can move, relative to the moving beam, along the second horizontal direction perpendicular to the first horizontal direction. The vertical slit is defined and the pulley assembly is mounted on the side wall of the cylinder, and the pulley assembly is arranged to move in the vertical direction relative to the cylinder. During the test, according to the test needs, the space pulling angle of the spiral anchor can be changed by selectively changing the position of the hoisting mechanism along the first horizontal direction, changing the position of the hoisting mechanism along the second horizontal direction, changing the position of the pulley assembly along the vertical direction, and rotating the cylinder. Therefore, the pullout resistance measuring device based on an anchor plate foundation of a submarine slope site according to the present invention can simulate a pulling test of a spiral anchor at any space angle in a submarine slope site in the space, thereby revealing a damage mode of the spiral anchor at different space pulling angles regarding a soil layer in the submarine slope site and a pullout bearing capacity exerting mechanism of the spiral anchor.

In addition, the pullout resistance measuring device based on an anchor plate foundation of a submarine slope site according to the present invention is simple in structure, and can flexibly set the space pulling angle of a spiral anchor according to the test needs, which not only saves test expenses, but also can obtain an ultimate pullout bearing capacity of the spiral anchor, and a pulling failure mechanism and its change law more accurately.

A pullout resistance measuring method based on an anchor plate foundation of a submarine slope site, where the method is on the basis of the above-mentioned pullout resistance measuring device based on an anchor plate foundation of a submarine slope site, the top of a soil sample in the pullout resistance measuring device based on an anchor plate foundation of a submarine slope site is composed of at least one inclined surface, and the measuring method includes the following steps:

S10, assembling a support, and mounting the support on a test site;

S20, mounting a moving beam on the support, and then mounting a hoisting mechanism on the moving beam;

S30, establishing a three-dimensional geometric coordinate system $O_1$-XYZ by taking a connection point $O_1$ where a spiral anchor is connected to a traction rope as the origin, where the X-axis direction of the three-dimensional geometric coordinate system $O_1$-XYZ is parallel to a second horizontal direction along which the hoisting mechanism can move, the Y-axis direction is parallel to a first horizontal direction along which the moving beam can move, and the Z-axis direction is parallel to the central axis of a cylinder; determining an angle $\gamma$ between the spiral anchor and the Z axis, an angle a between the projection of the spiral anchor on the $XO_1Y$ plane and the X axis, a pre-embedded horizontal distance $t_{sb}$ from the connection point $O_1$ where the spiral anchor is connected to the traction rope to the inner surface of the cylinder along the X-axis direction, a pre-embedded depth $h_4$ of the spiral anchor, a thickness $h_3$ of the soil sample corresponding to the connection point where the spiral anchor is connected to the traction rope along the Z-axis direction, and an inclination angle $\beta$ of the top of the soil sample; and measuring a thickness $t_b$ of the cylinder, a horizontal distance $t_{bc}$ from the center of a fixed pulley to the outer surface of the cylinder, a radius R of the fixed pulley, a vertical distance $h_1$ from the upper edge of the cylinder to the hoisting mechanism, a height $h_2$ of the cylinder, and a vertical distance $h_c$ from the geometric center of the fixed pulley to the upper edge of the cylinder;

S40, placing a cylinder device defined with a vertical slit and mounted with a pulley assembly on the position of a predetermined test site, where the cylinder of the cylinder device is made of transparent material;

S50, calculating whether the traction rope winds a critical angle $\gamma'$ around the fixed pulley, where the calculation formula of $\gamma'$ is as follows:

$$\gamma' = \frac{\pi}{2} - \arcsin\left[\frac{R}{\frac{L(h_2 + h_1 - h_3 - R)}{h_1 + h_2 + h_4 - h_3} - (t_{sb} + t_b + t_{bc})}\right];$$

S60, comparing the predetermined $\gamma$ with the calculated critical angle $\gamma'$, and determining whether the traction rope needs to wind around the fixed pulley;

S70, if the traction rope needs to wind around the fixed pulley, calculating, according to the predetermined $\alpha$ and $\gamma$, a position of the hoisting mechanism relative to the connection point $O_1$ where the spiral anchor is connected to the traction rope, and a position of the fixed pulley on the cylinder along the Z-axis direction, adjusting the positions of the hoisting mechanism and the fixed pulley according to the calculated position data, and rotating the cylinder correspondingly to make the vertical slit face the hoisting mechanism; and if the traction rope does not need to wind around the fixed pulley, calculating, according to the predetermined $\alpha$ and $\gamma$, a space relative coordinate position of the hoisting mechanism relative to the connection point $O_1$ where the spiral anchor is connected to the traction rope, and adjusting the position of the hoisting mechanism according to the obtained position data;

S80, according to the comparison result between the predetermined $\gamma$ and the critical angle $\gamma'$, connecting the traction rope to the spiral anchor after the traction rope is pulled out from the hoisting mechanism and then winds around the fixed pulley, or directly connecting the traction rope to the spiral anchor after the traction rope is pulled out from the hoisting mechanism and does not wind around the fixed pulley, and mounting a force measuring device on the traction rope;

S90, evenly filling the soil sample into the cylinder, when the height that the soil sample is filled is flush with the position of the pre-embedded depth $h_4$ of the connection point $O_1$ where the spiral anchor is connected to the traction rope, determining an insertion point of the spiral anchor on the surface of the soil sample according to the pre-embedded horizontal distance $t_{sb}$ from the connection point $O_1$ where the spiral anchor is connected to the traction rope to the inner surface of the cylinder along the X-axis direction, inserting the spiral anchor into the soil sample from the insertion point according to the predetermined $\alpha$ and $\gamma$, and then continuing the soil filling until the thickness of the soil sample reaches an expected thickness;

S100, arranging the top of the soil sample in a single inclined shape, and adjusting the inclination of the top of the soil sample according to the predetermined inclination angle β; and S110, starting the hoisting mechanism to carry out a test, reading the pullout resistance of the traction rope on the spiral anchor by means of the force measuring device, and observing changes in the soil sample at the same time.

In one of the embodiments, after step S110, step S120 is further included: during the test, if the angle γ between the spiral anchor and the Z axis and the angle a between the projection of the spiral anchor on the $XO_1Y$ plane and the X axis change according to the test needs, removing the original soil sample in the cylinder, modifying the state of whether the traction rope winds around the fixed pulley according to the changed γ, and then executing step 50 and steps after step 50 according to the modified α and γ, re-determined $t_{sb}$, $h_4$, $h_3$ and β, and $t_b$, $t_{bc}$, R, $h_1$, $h_2$ and $h_c$ measured in step S30, so as to carry out a new test.

In one of the embodiments, in step S60:

if γ is greater than 0 and less than γ′, the traction rope does not need to wind around the fixed pulley, and the position of the fixed pulley on the cylinder is arbitrary; and if γ is greater than or equal to γ′ and less than or equal to 90°, the traction rope needs to wind around the fixed pulley, and the position of the fixed pulley on the cylinder along the Z-axis direction is correspondingly adjusted according to the magnitude of the angle γ.

In one of the embodiments, in step S70, the calculation of space relative position coordinates of the hoisting mechanism in the three-dimensional space coordinate system $O_1$-XYZ relative to the connection point $O_1$ where the spiral anchor is connected to the traction rope specifically involves:

the hoisting mechanism is simplified to a point O;

when γ is equal to 0, the projection point of the coordinate point O of the hoisting mechanism on the $XO_1Y$ plane coincides with the connection point $O_1$ where the spiral anchor is connected to the traction rope, thus the space relative position coordinates of the coordinate point O of the hoisting mechanism in the three-dimensional space coordinate system $O_1$-XYZ relative to the connection point $O_1$ where the spiral anchor is connected to the traction rope are (0, 0, H), where $$H = h_2 + h_1 - h_3 + h_4;$$

when γ is greater than 0 and less than γ′, the horizontal distance from the point O where the hoisting mechanism is located to the connection point $O_1$ where the spiral anchor is connected to the traction rope is L=Htanγ, thus the displacement of the coordinate point O of the hoisting mechanism on the X axis relative to the connection point $O_1$ where the spiral anchor is connected to the traction rope is X=Lcosα=Htanγcosα, and the displacement on the Y axis is Y=Lsinα=Htanγsinα, and thus the space relative position coordinates of the coordinate point O of the hoisting mechanism in the three-dimensional space coordinate system $O_1$-XYZ relative to the connection point $O_1$ where the hoisting mechanism is connected to the traction rope are (Htanγcosα, Htanγsinα, H), where $$H = h_2 + H_1 - h_3 + h_4; \text{ and}$$

when γ is greater than or equal to γ′ and less than or equal to 90°, the vertical distance from the geometric center of the fixed pulley to the upper edge of the cylinder is:

$$h_c = h_2 - h_3 + h_4 - (t_{sb} + tb + t_{bc})\cot\gamma - \frac{R}{\sin\gamma};$$

the length of the traction rope from the connection point $O_1$ where the spiral anchor is connected to the traction rope to the tangent point of the fixed pulley is:

$$L_a = \frac{t_{sb} + t_b + t_{bc}}{\sin\gamma} + R\cot\gamma;$$

the length of the traction rope from the tangent point of the fixed pulley to the hoisting mechanism is:

$$L_b = \frac{h_1 + h_c}{\sin\gamma} + R\cot\theta_b;$$

thus, the displacement of the coordinate point O of the hoisting mechanism on the X axis relative to the connection point $O_1$ where the spiral anchor is connected to the traction rope is:

$$X = (L_a \sin\gamma + L_b \cos\theta_b) \cos\alpha, \text{ and}$$

the displacement of the coordinate point O of the hoisting mechanism on the Y axis relative to the connection point $O^1$ where the spiral anchor is connected to the traction rope is:

$$Y = (L_a \sin\gamma + L_b \cos\theta_b) \sin\alpha,$$

and thus, the relative position coordinates of the coordinate point O of the hoisting mechanism in the three-dimensional space coordinate system $O_1$-XYZ relative to the connection point $O_1$ where the spiral anchor is connected to the traction rope are $((L_a\sin\gamma + L_b\cos\theta_b)\cos\alpha$, $(L_a\sin\gamma + L_b\cos\theta_b)\sin\alpha$, H), where $H = h_2 + h_1 - h_3 + h_4$.

In one of the embodiments, before step S90, a step is further included: calculating the thicknesses of the soil sample respectively corresponding to the highest point and the lowest point at the top of the soil sample in the Z-axis direction by combining the measured inner diameter $R_1$ of the cylinder and the pre-embedded horizontal distance $t_{sb}$, which is determined before the test, from the connection point $O_1$ where the spiral anchor is connected to the traction rope to the inner surface of the cylinder along the X-axis direction, the inclination angle β of the top of the soil sample, and the thickness $h_3$ of the soil sample corresponding to the connection point $O_1$ where the spiral anchor is connected to the traction rope in the Z-axis direction;

in step S90, the expected thickness of the soil sample needs to be greater than or equal to the calculated thickness of the soil sample corresponding to the highest point at the top of the soil sample in the Z-axis direction; and in step S100, the top end of the soil sample is cut according to the calculated thicknesses of the soil sample respectively corresponding to the highest point and the lowest point at the top of the soil sample in the Z-axis direction until the top of the soil sample is formed into a single inclined plane with the inclination angle β.

The pullout resistance measuring method based on an anchor plate foundation of a submarine slope site according to the present invention has the beneficial effect as follows: by using the above-mentioned pullout resistance measuring device based on an anchor plate foundation of a submarine slope site, the pullout resistance measuring method based on an anchor plate foundation of a submarine slope site according to the present invention can reveal a damage mode of the spiral anchor at different space pulling angles regarding a soil sample in the submarine slope site and a pullout bearing capacity exerting mechanism, thereby achieving the purpose of guiding the project design of the spiral anchor.

BRIEF DESCRIPTION OF THE DRAWINGS

The present invention will be further described below in conjunction with the accompanying drawings and embodiments.

REFERENCE NUMERALS

Figure 1:
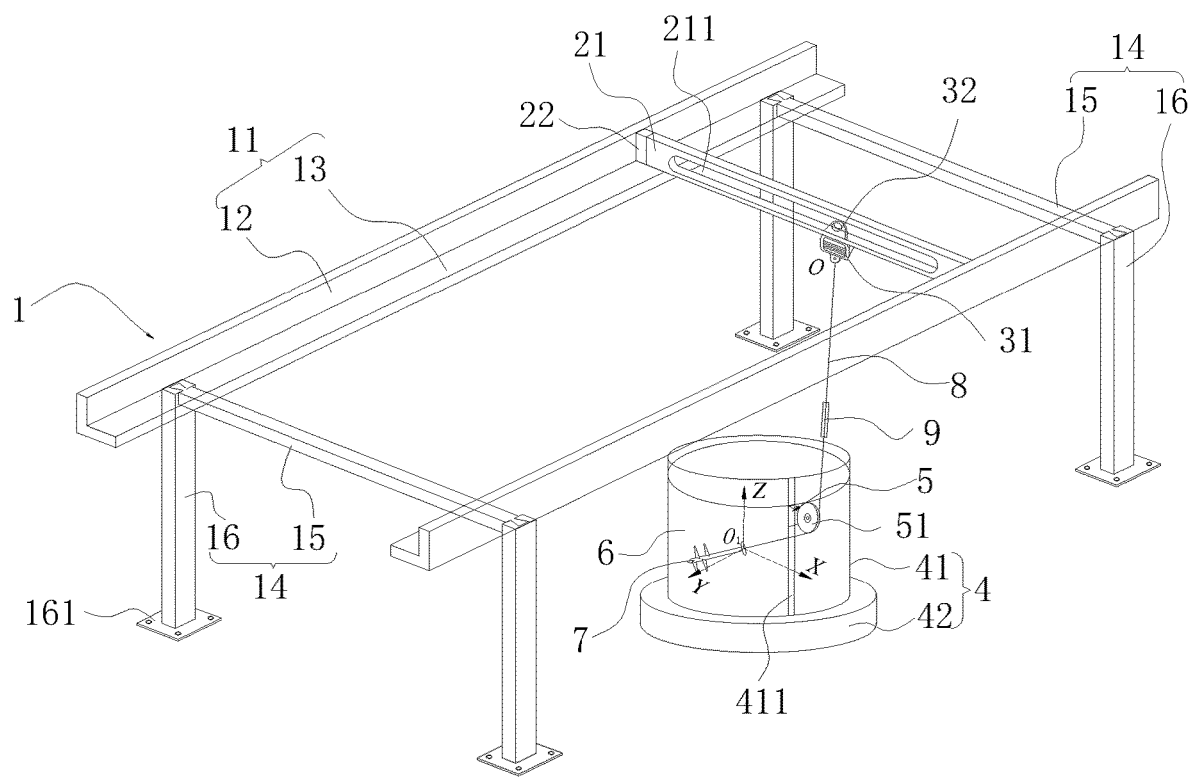
FIG. 1 is a three-dimensional structural schematic diagram of the pullout resistance measuring device based on an anchor plate foundation of a submarine slope site shown in an embodiment of the present invention after a first camera, a second camera and a laser displacement sensor are removed.

1, support; 11, track longitudinal beam; 12, first plate; 13, second plate; 14, support assembly; connecting beam; 16, support rod; 161, support foot plate; 21, moving beam; 211, beam sliding track; 22, beam magnetic part; 31, hoisting mechanism; 32, hoisting magnetic part; 4, cylinder device; 41, cylinder; 411, vertical slit; 412, vertical sliding track; 413, first scale line; 414, second scale line; 42, chassis; 421, positioning groove; 5, pulley assembly; 51, fixed pulley; 6, soil sample; 7, spiral anchor; 8, traction rope; 9, force measuring device; 101, first camera; 102, laser displacement sensor; and 103, second camera.

DETAILED DESCRIPTION

Embodiment One

Referring to FIG. 1 to FIG. 11, provided is a pullout resistance measuring device based on an anchor plate foundation of a submarine slope site according to an embodiment of the present invention. The pullout resistance measuring device includes a support 1, a moving beam 21, a hoisting mechanism 31, a cylinder device 4, a pulley assembly 5, a soil sample 6, a spiral anchor 7, a traction rope 8 and a force measuring device 9. The moving beam 21 is mounted on the support 1 and can move along a first horizontal direction relative to the support 1 to change the mounting position. The hoisting mechanism 31 is mounted on the moving beam 21 and can move along a second horizontal direction perpendicular to the first horizontal direction to change the mounting position. The cylinder device 4 includes a cylinder 41 with both open ends, and the side of the cylinder 41 facing the hoisting mechanism 31 is provided with a vertical slit 411. The pulley assembly 5 is mounted on the side wall of the cylinder 41 corresponding to the vertical slit 411 and can move in the vertical direction relative to the cylinder 41 so that the mounting position of the pulley assembly 5 on the cylinder 41 can be changed, the pulley assembly 5 includes a fixed pulley 51, and the center line of the fixed pulley 51 is perpendicular to the extending direction of the vertical slit 411. The soil sample 6 is filled in the cylinder 41, and the top of the soil sample 6 is arranged in an inclined shape; the spiral anchor 7 is buried in the soil sample 6. One end of the traction rope 8 is connected to the hoisting mechanism 31, and the other end is directly connected to the spiral anchor 7 by running through the opening on the top of the cylinder 41, or connected to the spiral anchor 7 after winding around the fixed pulley 51 and running through the vertical slit 411. The central axis of the portion of the traction rope 8 adjacent to the spiral anchor 7 is located on the same straight line as the center point of the cross section of the spiral anchor 8, that is to say, the portion of the traction rope 8 adjacent to the spiral anchor 7 is arranged coaxially with the spiral anchor 7; and the force measuring device 9 is mounted on the traction rope 8.

When in a test, the hoisting mechanism 31 pulls the spiral anchor 7 embedded in the cylinder device 4 by winding the traction rope 8, so as to achieve the purpose of the test. During the test, the spiral anchor 7 disperses the pulling force applied by the traction rope 8 in the soil sample 6.

Figure 5:
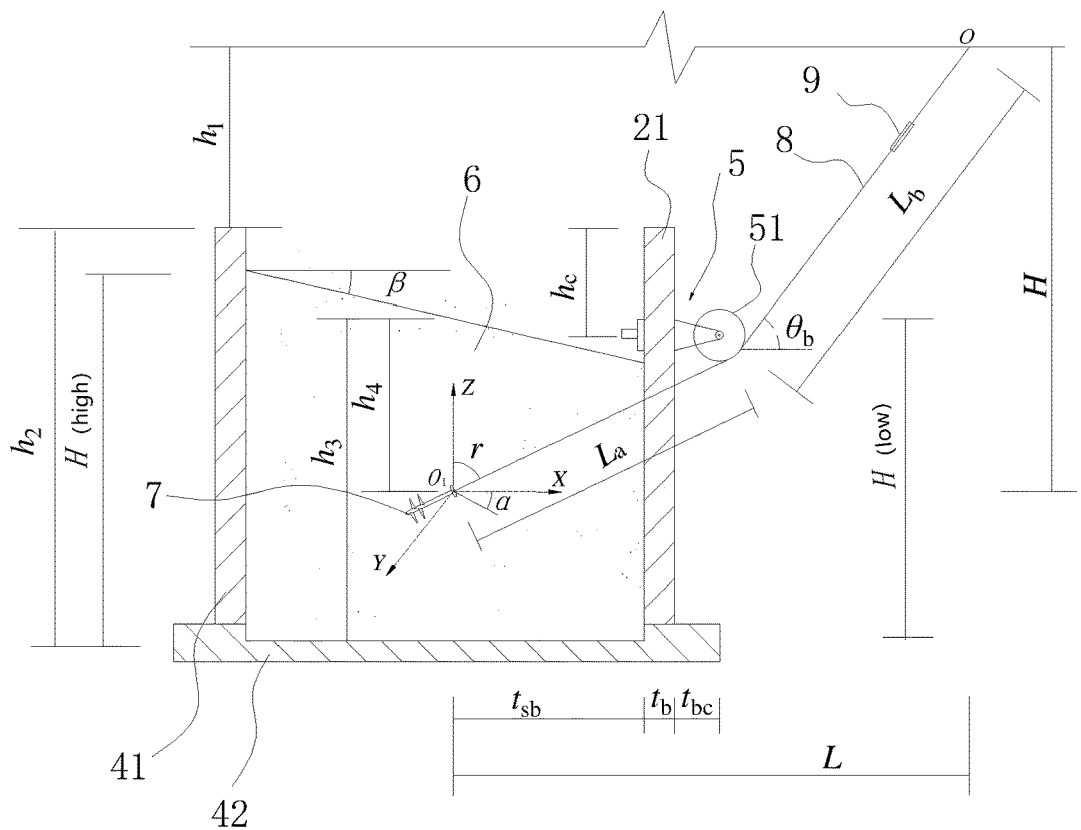
FIG. 5 is a partial schematic diagram of the pullout resistance measuring device based on an anchor plate foundation of a submarine slope site according to the present invention when the angle γ between the portion of the traction rope connected to the spiral anchor and the Z axis is greater than γ' and less than 90°.
Figure 6:
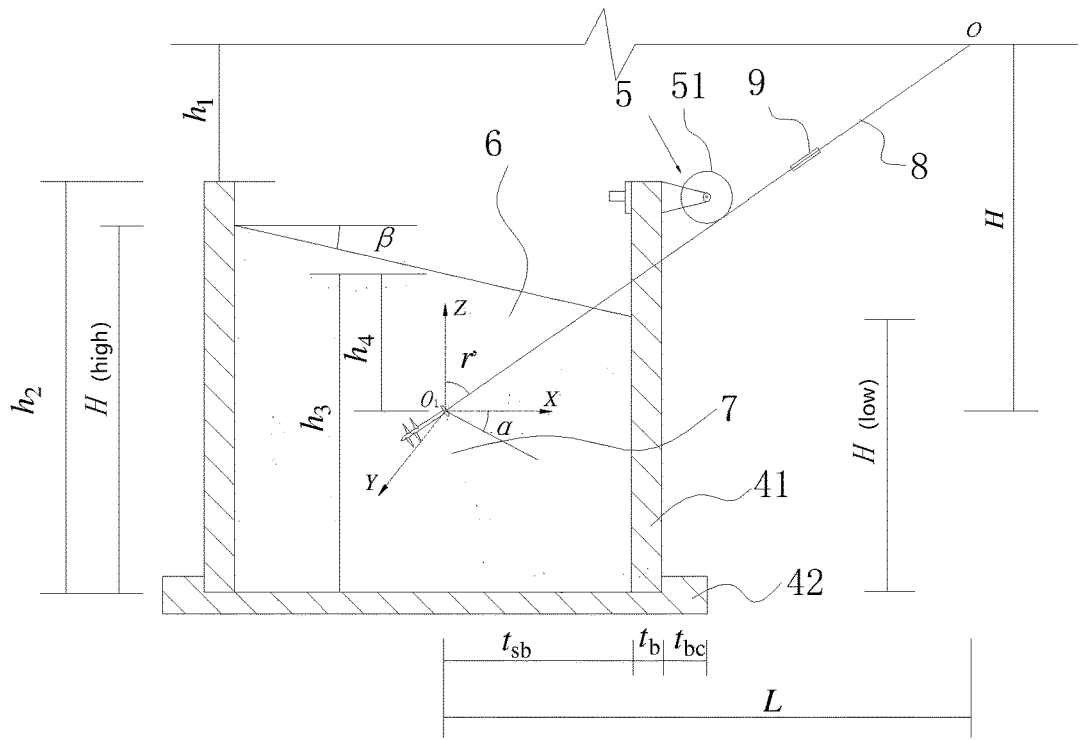
FIG. 6 is a partial schematic diagram of the pullout resistance measuring device based on an anchor plate foundation of a submarine slope site according to the present invention when the angle γ' between the portion of the traction rope connected to the spiral anchor and the Z axis is equal to γ.
Figure 7:
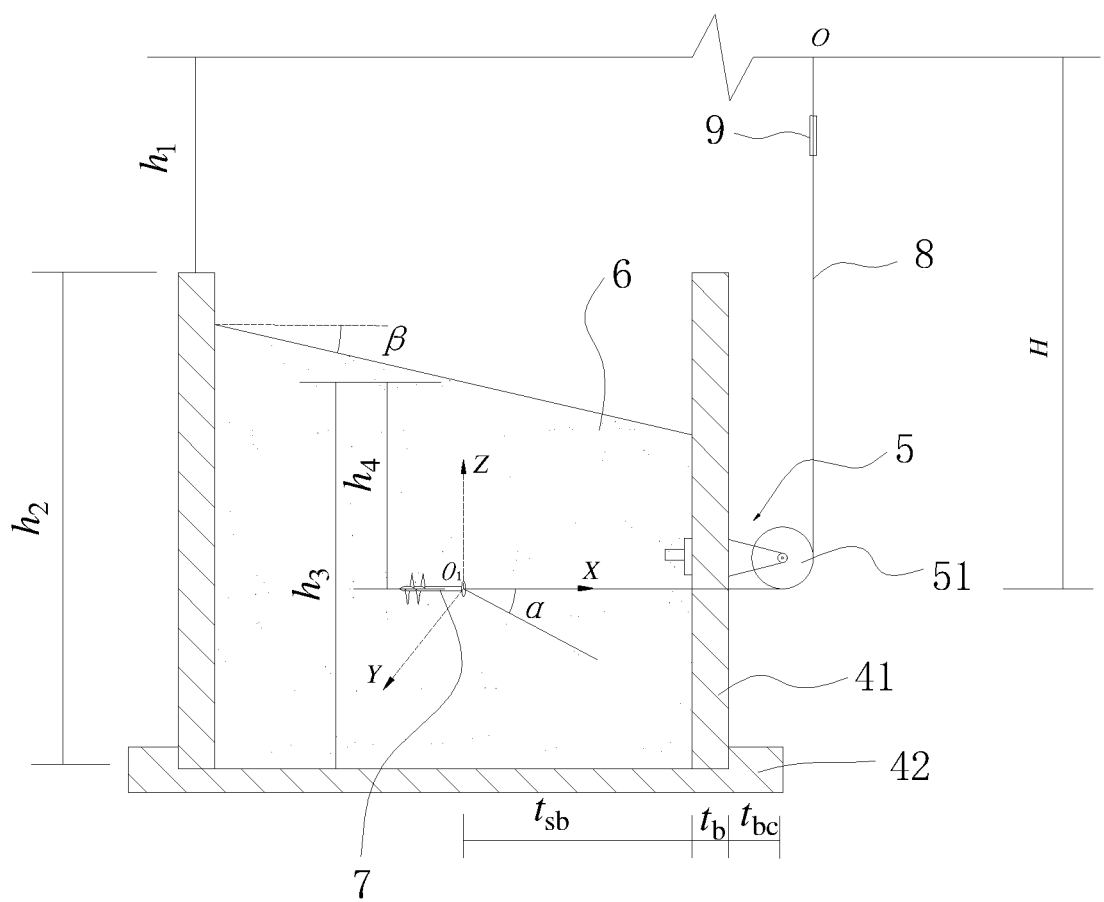
FIG. 7 is a partial schematic diagram of the pullout resistance measuring device based on an anchor plate foundation of a submarine slope site according to the present invention when the angle γ between the portion of the traction rope connected to the spiral anchor and the Z axis is equal to 90°.
Figure 8:
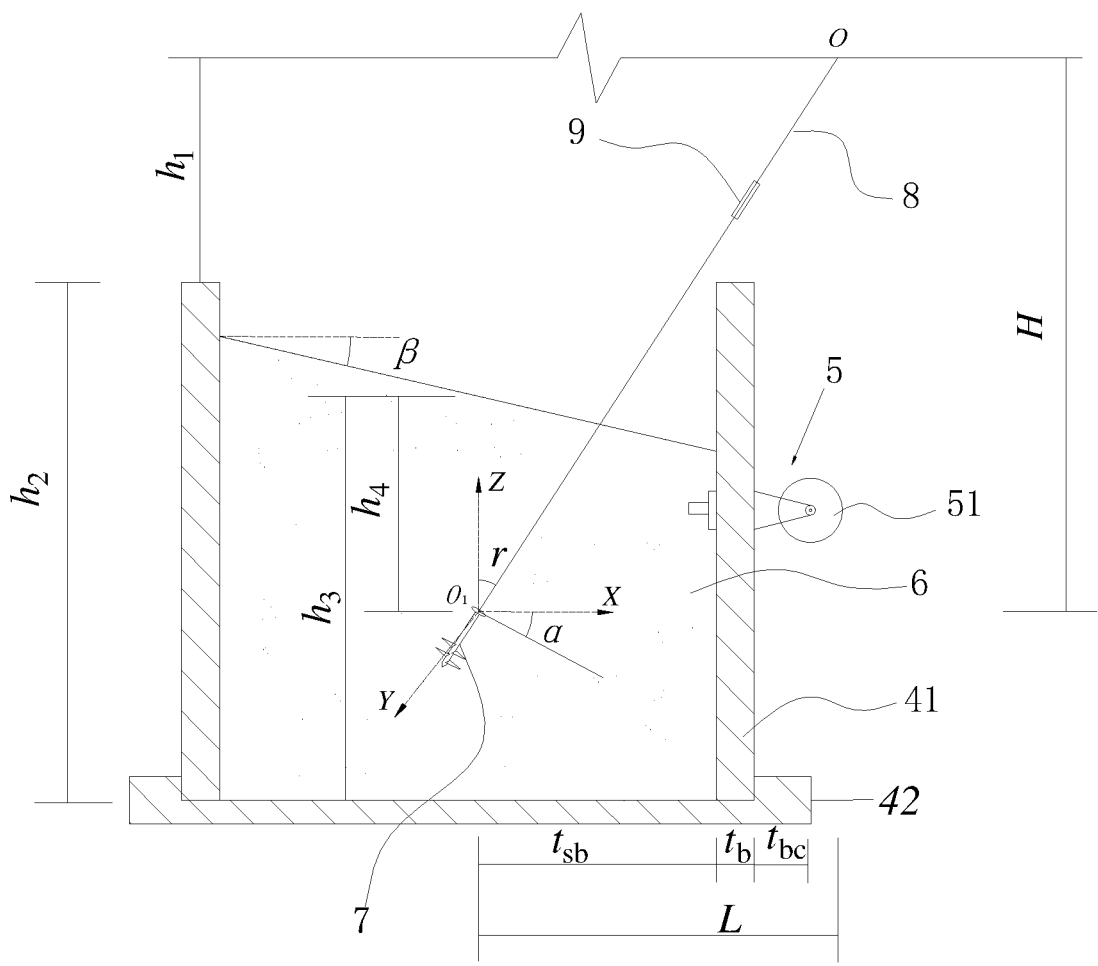
FIG. 8 is a partial schematic diagram of the pullout resistance measuring device based on an anchor plate foundation of a submarine slope site according to the present invention when the angle γ between the portion of the traction rope connected to the spiral anchor and the Z axis is greater than 0 and less than γ'.
Figure 9:
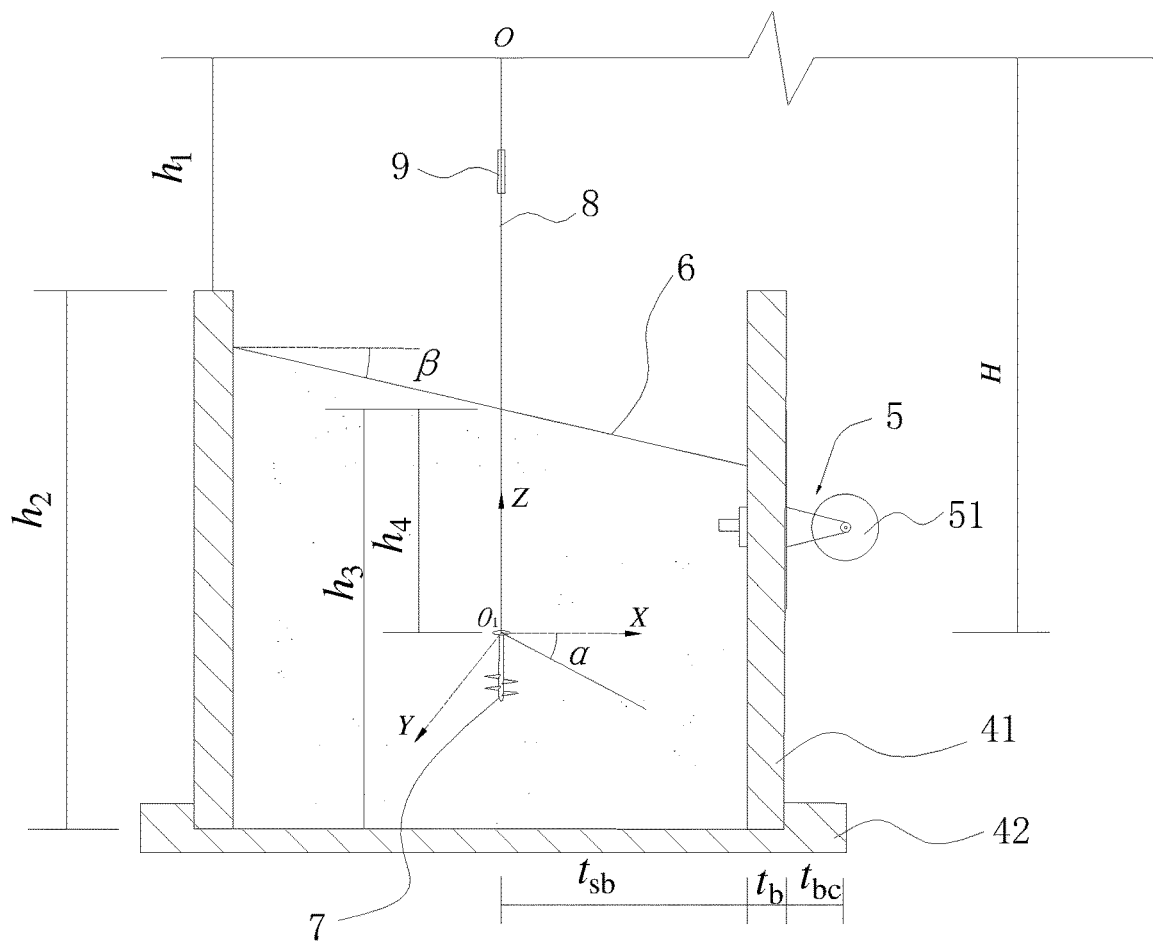
FIG. 9 is a partial schematic diagram of the pullout resistance measuring device based on an anchor plate foundation of a submarine slope site according to the present invention when the angle γ between the portion of the traction rope connected to the spiral anchor and the Z axis is equal to 0.

As shown in FIG. 1, a three-dimensional geometric coordinate system $O_1$-XYZ is established by taking a point $O_1$ where the spiral anchor 7 is connected to the traction rope 8 as the origin, the first horizontal direction is set as the Y-axis direction, the second horizontal direction is set as the X-axis direction, the angle between the spiral anchor 7 and the Z axis is set as γ, the angle between the projection of the spiral anchor 7 on the $XO_1Y$ plane and the X axis is set as α, and α and γ are called the space pulling angles of the spiral anchor 7. As shown in FIG. 6, when γ is adjusted to the states that the traction rope 8 connecting the hoisting mechanism 31 and the spiral anchor 7 is in a straight line, and is tangent to the fixed pulley 51, the angle γ between the spiral anchor and the Z axis is equal to γ', and the angle value γ is an adjacent angle value that determines whether the traction rope 8 needs to wind around the fixed pulley 51. When γ is greater than 0 and less than γ', as shown in FIG. 8 and FIG. 9, the traction rope 8 does not need to wind around the fixed pulley 51. At this time, the angle γ is small, and the traction rope 8 will not touch the upper edge of the cylinder 41, so that there is no need to wind around the fixed pulley 51. When γ is greater than or equal to γ' and less than or equal to 90°, as shown in FIG. 5 to FIG. 7, the traction rope 8 needs to wind around the fixed pulley 51. At this time, the angle γ is large, and the traction rope 8 will be in contact with the side wall of the cylinder 41 without using the fixed pulley 51. After the contact, the cylinder 41 will generate a large resistance to the traction rope 8, which resistance affects the test accuracy of the pulling test. Therefore, it is necessary to use the fixed pulley 51. Within the angle range, when it is necessary to change an angle, it is only necessary to adjust the position of the fixed pulley 51 on the cylinder 41 along the Z-axis direction. Therefore, during the test, in combination with the pulley assembly 5 and the vertical slit 411 on the side wall of the cylinder 41, the pulling of the spiral anchor 7 at any angle in the range of 0°-90° along α and γ can be realized.

During the test, the present invention can carry out pulling tests at different space pulling angles on the spiral anchor 7. When at least one of the pulling angles α and γ changes and the traction rope 8 does not wind around the fixed pulley 51, the relative coordinate position of the hoisting mechanism in the three-dimensional space coordinate system $O_1$-XYZ relative to the connection point $O_1$ where the spiral anchor 7 is connected to the traction rope 8 is calculated according to α and γ, and the position of the hoisting mechanism is adjusted according to the obtained position data, so that the space pulling angle of the spiral anchor 7 can reach a desired angle.

When at least one of the pulling angles a and y changes and the traction rope 8 winds around the fixed pulley 51, the position of the hoisting mechanism in the three-dimensional space coordinate system $O_1$-XYZ relative to the connection point $O_1$ where the spiral anchor 7 is connected to the traction rope 8 and the position of the fixed pulley 51 on the cylinder 41 along the Z-axis direction are calculated according to αand γ, the positions of the hoisting mechanism and the fixed pulley 51 are adjusted according to the calculated position data, and the cylinder 41 is correspondingly rotated to make the vertical slit 411 of the cylinder 41 face the hoisting mechanism, so that the space pulling angle of the spiral anchor 7 can reach a desired angle.

In this embodiment, the hoisting mechanism 31 is adsorbed and fixed on the moving beam 21 by means of a hoisting magnetic part 32. The hoisting magnetic part 32 can facilitate changing the mounting position of the hoisting mechanism 31 on the moving beam 21 along the second horizontal direction according to the test needs, where the second horizontal direction is the length extension direction of the moving beam 21. Further, a beam sliding track 211 is arranged on the moving beam 21, the beam sliding track 211 extends along the second horizontal direction, and the hoisting magnetic part 32 is matched with the beam sliding track 211 in a sliding manner. The arrangement of the beam sliding track 211 can ensure that the hoisting mechanism 31 plays a guiding role when moving along the second horizontal direction and changing its position, thereby preventing the displacement of the hoisting mechanism 31 along the Z-axis direction, resulting in affecting the test results.

The hoisting magnetic part 32 is a magnet or an electromagnet. Certainly, the structure for changing the mounting position of the hoisting mechanism 31 on the moving beam 21 along the second horizontal direction is not limited to the hoisting magnetic part 32. In other embodiments, the structure can also be realized by matching bolts with long holes, that is, long holes extending along the second horizontal direction are defined on the moving beam 21, and then the hoisting mechanism 31 is fixed onto the moving beam 21 by matching bolts with the long holes.

Both ends of the moving beam 21 are adsorbed and fixed on the support 1 by means of beam magnetic parts 22. The arrangement of the beam magnetic parts 22 can facilitate changing the mounting position of the hoisting mechanism 31 on the support 1 along the first horizontal direction according to the test needs. The beam magnetic parts 22 are magnets or electromagnets.

Specifically, the support 1 includes track longitudinal beams 11 and support assemblies 14, where there are two track longitudinal beams 11, which are parallel and symmetrically disposed, and there are two support assemblies 14, which are located below the track longitudinal beams 11 and both connected to the two track longitudinal beams 11; and two support rods 16 are respectively arranged corresponding to two ends of the track longitudinal beams 11, where the first horizontal direction is the length extension direction of the track longitudinal beams 11.

Further preferably, the track longitudinal beams 11 are L-shaped and each includes a first plate 12 and a second plate 13 that are connected vertically, a longitudinal slide rail extending along the first horizontal direction is formed between the first plate 12 and the second plate 13, and the longitudinal slide rails of the two track longitudinal beams 11 face each other; both ends of the moving beam 21 are respectively located in the longitudinal slide rails of the two track longitudinal beams 11, and are adsorbed and fixed on the second plates 13 by means of the beam magnetic parts 22. By arranging the track longitudinal beams 11 into a structure with a longitudinal track, the end of the moving beam 21 is located in the longitudinal track, so that the track longitudinal beams 11 can limit the movement of the moving beam 21 in the second horizontal direction and the Z-axis direction, thereby ensuring the accuracy of the displacement of the hoisting mechanism 31 along the first horizontal direction.

The beam magnetic parts are magnets or electromagnets. Certainly, the structure for changing the position of the moving beam 21 on the support 1 along the first horizontal direction is not limited to the beam magnetic parts 22. In other embodiments, the structure can also be realized by matching bolts with long holes, that is, long holes are defined on the track longitudinal beams 11, and then the moving beam 21 is fixed onto the track longitudinal beams 11 of the support 1 by matching bolts with the long holes.

In this embodiment, each support assembly 14 includes a connecting beam 15 and two support rods 16, where the connecting beam 15 is connected to the second plates 13 of the two track longitudinal beams 11, and the two support rods 16 are respectively connected to both ends of the connecting beam 15 and are respectively fixed on the second plates 13 of the two track longitudinal beams 11. The bottom of each support rod 16 is provided with a support foot plate 161, which is fixed on the test site by expansion screws.

The side wall of cylinder 41 is made of transparent material. In this embodiment, the transparent material is PVC plastic. Certainly, the selection of the transparent material for the side wall of the cylinder 41 in the present invention is not limited to PVC plastics, and other transparent materials, such as transparent tempered glass, that can facilitate the observation of changes in the soil sample 6 in the cylinder 41 can also be used in the present invention.

Figure 2:
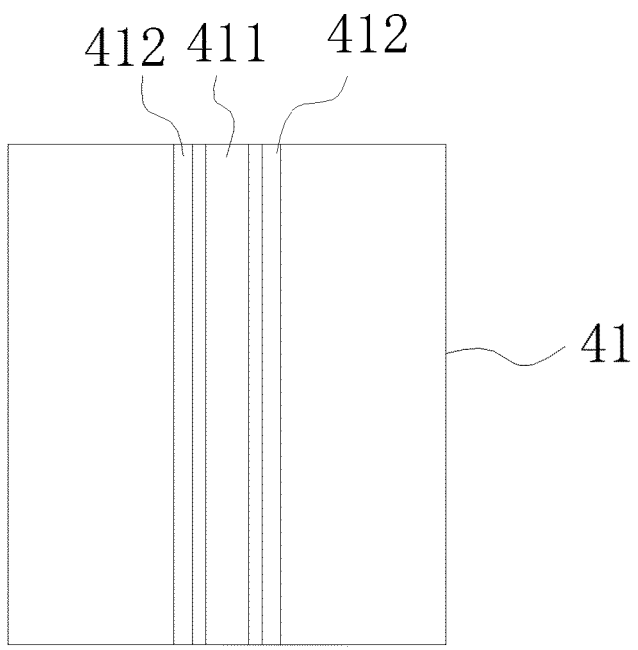
FIG. 2 is a side view of the cylinder in FIG. 1.

In this embodiment, as shown in FIG. 2, a vertical sliding track 412 is provided on at least one side of the vertical slit 411 on the side wall of the cylinder 41, and the vertical sliding track 412 is slidably fitted with the pulley assembly 5, so that the pulley assembly 5 can slide on the side wall of the cylinder 41, and after the pulley assembly 5 slides, the fixing of the pulley assembly 5 can be realized. In this embodiment, both sides of the vertical slit 411 are provided with vertical sliding tracks 412.

Further, positioning mark points (not shown in the figure) and scale lines (not shown in the figure) are defined on the side wall of the cylinder 41, where the scale lines can be used to observe the filling thickness of the soil sample 6.

Figure 3:
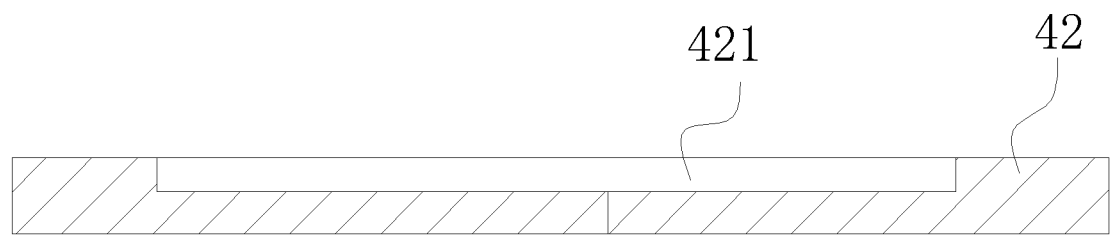
FIG. 3 is a top view of the chassis in FIG. 1.

The cylinder device 4 further includes a chassis 42 disposed below the cylinder 41. As shown in FIG. 3, the top of the chassis 42 is provided with a positioning groove 421, and the bottom end of the cylinder 41 is rotatably disposed in the positioning groove 421. The arrangement of the positioning groove 421 on the chassis 42 can ensure that the central axis of the cylinder 41 will not shift when the pulling angle of the spiral anchor 7 is adjusted in the space to rotate the cylinder 41.

In this embodiment, the positioning groove 421 is columnar. In other embodiments, the positioning groove 421 can be set in a ring shape, and the setting of the shape of the positioning groove 421 can reduce the contact area between the cylinder 41 and the soil sample 6.

This test is a study on pullout bearing characteristics of an anchor plate foundation of a submarine slope site. Since there are various forms of submarine site settings, the top of the soil sample 6 can be set to be composed of at least one inclined surface, such as single inclined surfaces, double inclined surfaces, and triple inclined surfaces. When there are more than two inclined surfaces, the inclination angles of all inclined surfaces can be set to be equal, so as to simulate the submarine pulling situation at equal inclination; or the inclination angles of all inclined surfaces can be set to be unequal, so as to study the submarine pulling situation at unequal inclination. Further preferably, a single inclination (that is, the top of the soil sample 6 is composed of one inclined surface) is relatively simple, and is also the basis for studying other inclination conditions. Therefore, in this embodiment, the top of the soil sample 6 is set to be composed of one inclined surface with an inclination angle (3, and the inclination direction is preferably inclined downward from the cylinder 41 toward the hoisting mechanism 31.

To facilitate the observation of the test, in this embodiment, the soil sample 6 is made of transparent soil. In other embodiments, colored sand layers may be provided in the soil sample 6, and the colored sand layers are arranged at intervals along the central axis of the cylinder 41. The arrangement of the colored sand layers can facilitate better observation of the deformation of the soil sample 6.

Figure 4:
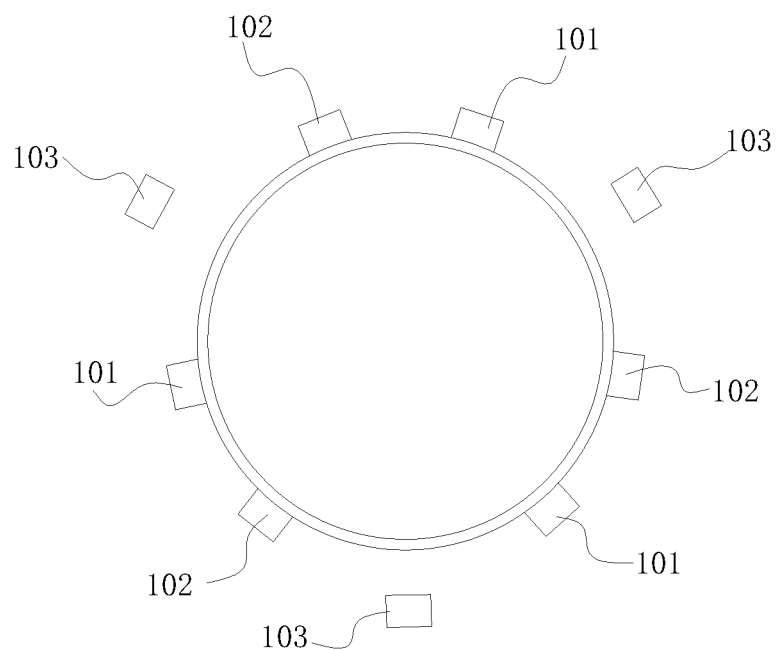
FIG. 4 is a schematic top view of an assembly composed of the cylinder, the first camera, the second camera and the laser displacement sensor.

The pullout resistance measuring device based on an anchor plate foundation of a submarine slope site according to the present invention further includes an observation device used for observing changes in the soil sample 6. Further, as shown in FIG. 4, the observation device includes first cameras 101, laser displacement sensors 102, and second cameras 103. The first cameras 101 and the laser displacement sensors 102 are mounted on the side wall of the cylinder 41, and the second cameras 103 are provided on the periphery of the cylinder 41. The first cameras 101 are used for capturing the deformation of the upper surface of the soil sample 6 during the winding process of the hoisting mechanism 31, the laser displacement sensors 102 are used for capturing the displacement of the upper surface of the soil sample 6 during the winding process of the hoisting mechanism 31, and the second cameras 103 are used for capturing the deformation of the peripheral surface of the soil sample 6 during the winding process of the hoisting mechanism 31. In this embodiment, there are each three first cameras 101, three laser displacement sensors 102, and three second cameras 103, and the three first cameras 101, the three laser displacement sensors 102, and the three second cameras 103 are all evenly distributed in a ring around the central axis of the cylinder 41. In order to prevent the first cameras 101, the laser displacement sensors 102, and the second cameras 103 from blocking each other, the first cameras 101, the laser displacement sensors 102, and the second cameras 103 are arranged staggered.

This embodiment has the beneficial effects as follows: according to the pullout resistance measuring device based on an anchor plate foundation of a submarine slope site according to the present invention, by arranging the cylinder device 4 which includes a bottomless cylinder 41 with both open ends, the spiral anchor 7 is buried in the soil sample 6 placed in the cylinder 41 and the top of the soil sample 6 is set to be composed of at least one inclined surface, and the hoisting mechanism 31 and the spiral anchor 7 are connected by the traction rope 8. During the test, applying a pulling force to the spiral anchor 7 embedded in the cylinder 41 by winding the traction rope 8 via the hoisting mechanism 31 can realize a pulling simulation of the spiral anchor 7 in the submarine slope site in the space. By mounting the moving beam 21 on the support 1 and mounting the hoisting mechanism 31 on the moving beam 21, the moving beam 21 is arranged to move along the first horizontal direction relative to the support 1, and the hoisting mechanism 31 can move, relative to the moving beam 32, along the second horizontal direction perpendicular to the first horizontal direction. The vertical slit 411 is defined and the pulley assembly 5 is mounted on the side wall of the cylinder 41, and the pulley assembly 5 is arranged to move in the vertical direction relative to the cylinder 41. During the test, according to the test needs, the space angle of the spiral anchor 7 can be changed by selectively changing the position of the hoisting mechanism 31 along the first horizontal direction, changing the position of the hoisting mechanism 31 along the second horizontal direction, changing the position of the pulley assembly 5 along the vertical direction, and rotating the cylinder 41. Therefore, the pullout resistance measuring device based on an anchor plate foundation of a submarine slope site according to the present invention can simulate a pulling test of a spiral anchor 7 at any space angle in a submarine slope site in the space, thereby revealing a damage mode of the spiral anchor 7 at different pulling space angles regarding a soil layer in the submarine slope site and a pullout bearing capacity exerting mechanism of the spiral anchor 7, and further achieving the purpose of guiding the project design and construction of the spiral anchor 7.

In addition, the pullout resistance measuring device based on an anchor plate foundation of a submarine slope site according to the present invention is simple in structure, and can flexibly set the space angle of a spiral anchor according to the test needs, which not only saves test expenses, but also can obtain an ultimate pullout bearing capacity of the spiral anchor 7, and a pulling failure mechanism and its change law more accurately.

Embodiment Two

Disclosed in this embodiment is a pullout resistance measuring method based on an anchor plate foundation of a submarine slope site, which method is on the basis of the pullout resistance measuring device based on an anchor plate foundation of a submarine slope site according to embodiment one, where the top of a soil sample 6 is selected to be composed of an inclined surface, that is, the top of the soil sample 6 is in the form of a single inclination, and the pullout resistance measuring method based on an anchor plate foundation of a submarine slope site according to this embodiment includes the following steps:

S10, assemble a support 1, and mount the support 1 on a test site.

Step S10 specifically includes the following steps:

a1, fix support rods 16 on the test site by means of expansion nuts; and a2, connect track longitudinal beams 11, connecting beams 15 and the support rods 16 by mortise and tenon to assemble the support 1.

In step a2, first plates 12 and second plates 13 of the track longitudinal beams 11 are integrally formed, and the track longitudinal beams 11 are respectively assembled with the connecting beams 15 and the support rods 16 by mortise and tenon by means of the second plates 13.

S20, mount a moving beam 21 on the support 1, and then mount a hoisting mechanism 31 on the moving beam 21.

Specifically, both ends of the moving beam 21 are adsorbed and fixed on the support 1 by means of beam magnetic parts 22, and the hoisting mechanism 31 is adsorbed and fixed on the moving beam 21 by means of a hoisting magnetic part 32.

As mentioned in embodiment one, the mounting position of the hoisting mechanism 31 on the support 1 can be adjusted along a first horizontal direction and a second horizontal direction. In this embodiment, the second horizontal direction is selected as the length extension direction of the moving beam 21, and the first horizontal direction as the length extension direction of the track longitudinal beams 11.

S30, establish a three-dimensional geometric coordinate system $O_1$-XYZ by taking a connection point $O_1$ where a spiral anchor 7 is connected to a traction rope 8 as the origin, where the X-axis direction of the three-dimensional geometric coordinate system $O_1$-XYZ is parallel to the second horizontal direction along which the hoisting mechanism 31 can move, the Y-axis direction is parallel to the first horizontal direction along which the moving beam 21 can move, and the Z-axis direction is parallel to the central axis of a cylinder 41; determine an angle γ between the spiral anchor 7 and the Z axis, an angle a between the projection of the spiral anchor 7 on the $XO_1Y$ plane and the X axis, a pre-embedded horizontal distance $t_{sb}$ from the connection point $O_1$ where the spiral anchor 7 is connected to the traction rope 8 to the inner surface of the cylinder 41 along the X-axis direction, a pre-embedded depth $h_4$ of the spiral anchor 7, a thickness $h_3$ of the soil sample 6 corresponding to the connection point where the spiral anchor 7 is connected to the traction rope 8 along the Z-axis direction, and an inclination angle β of the top of the soil sample 6; and measure a thickness $t_b$ of the cylinder 41, a horizontal distance $t_{bc}$ from the center of a fixed pulley 51 to the outer surface of the cylinder 41, a radius R of the fixed pulley 51, a vertical distance hi from the upper edge of the cylinder 41 to the hoisting mechanism 31, a height $h_2$ of the cylinder 41, and a vertical distance $h_c$ from the geometric center of the fixed pulley 51 to the upper edge of the cylinder 41.

S31, calculate the thicknesses of the soil sample 6 respectively corresponding to the highest point and the lowest point at the top of the soil sample 6 in the Z-axis direction by combining the measured inner diameter $R_1$ of the cylinder 41 and the pre-embedded horizontal distance $t_{sb}$, which is determined before the test, from the connection point $O_1$ where the spiral anchor 7 is connected to the traction rope 8 to the inner surface of the cylinder 41 along the X-axis direction, the inclination angle β of the top of the soil sample 6, and the thickness $h_3$ of the soil sample 6 corresponding to the connection point $O_1$ where the spiral anchor 7 is connected to the traction rope 8 in the Z-axis direction.

Figure 10:
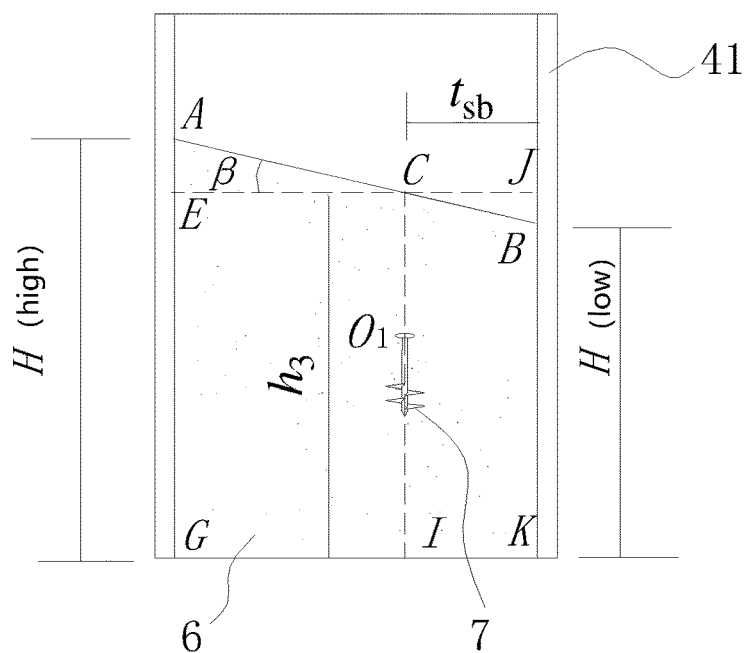
FIG. 10 is a structural schematic diagram of the assembly composed of the cylinder, the soil sample, the spiral anchor, and the pulley device in FIG. 1.

Specifically, referring to FIG. 10, in which AG is the thickness $H_{(high)}$ of the soil sample 6 corresponding to the highest point of the top layer of the soil sample 6 along the Z-axis direction; EJ is the measured inner diameter $R_1$ of the cylinder 41; JK is the thickness $H_{(low)}$ of the soil sample 6 corresponding to the lowest point of the top layer of the soil sample 6 along the Z-axis direction; CI is the thickness $h_3$, which is set before the test, of the pre-filled soil sample 6 corresponding to the connection point $O_1$ where the spiral anchor 7 is connected to the traction rope 8 in the Z-axis direction; and CJ is the pre-embedded horizontal distance $t_{sb}$, which is set before the test, from the connection point $O_1$ where the spiral anchor 7 is connected to the traction rope 8 to the inner surface of the cylinder 41 along the X-axis direction, it can therefore be seen from the geometric relationship in FIG. 10 that:

$$|BK|=|JK|-|JB|; |AG|=|AE|+|EG|;$$

$$|JK|=|CI|; |EG|=|CI|,$$

So that $|BK|=|CI|-|JB|=|CI|-|CH|\tan\beta=h_3-t_{sb}\tan\beta$; $|AG|=|CI|+|AE|=|CI|+|EG|\tan\beta=|CI|+(|JE|-|CH|)\tan\beta=h_3+(R_1-t_{sb})\tan\beta$; and $|AG|=|CI|+|AE|=|CI|+|EG|\tan\beta=|CI|+(|JE|-|CH|)\tan\beta=h_3+(R_1-t_{sb})\tan\beta$;

Thus, the thickness of the soil sample 6 corresponding to the highest point at the top of the soil sample 6 along the Z-axis direction is:

$$H_{(low)}=|BK|=h_3-t_{sb}\tan\beta;$$

the thickness of the soil sample 6 corresponding to the lowest point at the top of the soil sample 6 along the Z-axis direction is:

$$H_{(high)}=|AG|=h_3+(R_1-t_{sb})\tan\beta;$$

Preferably, the lowest point at the top of the soil sample 6 is arranged close to the hoisting mechanism 31, and the highest point at the top of the soil sample 6 is arranged away from the hoisting mechanism 31.

S40, place a cylinder device 4 defined with a vertical slit 411 and mounted with a pulley assembly 5 on the position of a predetermined test site, where the cylinder 41 of the cylinder device 4 is made of transparent material.

Specifically, the chassis 42 of the cylinder device 4 is first placed on the position of the predetermined test site, and then the cylinder 41 defined with the vertical slit 411 and mounted with the pulley assembly 5 is placed on the chassis 42. When the cylinder 41 is placed on the chassis 42, the bottom end of the cylinder 41 is rotatably placed in a positioning groove 421 provided on the top of the chassis 42, so that the central axis of the cylinder 41 will not shift when the cylinder 41 is rotating. In order to enable the rotation of the cylinder 41 to an accurate position, the angle between the projection of the portion of the traction rope 8 near the spiral anchor 7 on the $XO_1Y$ plane and the X axis is accurately determined, and in other feasible embodiments, angular scale lines surrounding the cylinder 41 can be defined on the top surface of the chassis 42.

The cylinder 41 is made of a transparent material, which is beneficial to observe changes in the soil sample 6 through the cylinder 41 when the spiral anchor 7 is pulled.

S41, mount first cameras 101 and laser displacement sensors 102 on the side wall of the cylinder device 4, and arrange second cameras 103 at the periphery of the cylinder 41.

Specifically, there are each more than one camera 101, one laser displacement sensor 102, and one second camera 103. In this embodiment, the number is each selected as three. Three first cameras 101, three laser displacement sensors 102, and three second cameras 103 are all mounted at equal intervals around the central axis of the cylinder 41. In order to prevent the first cameras 101, the laser displacement sensors 102, and the second cameras 103 from blocking each other, the first cameras 101, the laser displacement sensors 102, and the second cameras 103 are arranged staggered preferably during the mounting.

S50, calculate whether the traction rope 8 winds around a critical angle $\gamma'$ of the fixed pulley 51, where the calculation formula of $\gamma'$ is as follows:

$$\gamma' = \frac{\pi}{2} - \arcsin\left[\frac{R}{\frac{L(h_2 + h_1 - h_3 - R)}{h_1 + h_2 + h_4 - h_3} - (t_{sb} + t_b + t_{bc})}\right].$$

Specifically, as shown in FIG. 6, when the traction rope 8 connecting the spiral anchor 7 and the hoisting mechanism 31 is straight and tangent to the fixed pulley 51, the angle $\gamma$ between the traction rope 8 and the Z axis is equal to $\gamma'$.

S60, compare the predetermined $\gamma$ with the calculated critical angle $\gamma'$, and determine whether the traction rope 8 needs to wind around the fixed pulley 51.

Specifically, if $\gamma$ is greater than 0 and less than $\gamma'$, as shown in FIG. 8 and FIG. 9, the traction rope 8 does not need to wind around the fixed pulley 51, and the position of the fixed pulley 51 on the cylinder 41 is arbitrary; and if y is greater than or equal to $\gamma'$ and less than or equal to 90°, as shown in FIG. 5 to FIG. 7, the traction rope 8 needs to wind around the fixed pulley 51, and the position of the fixed pulley 51 on the cylinder 41 along the Z-axis direction is correspondingly adjusted according to the magnitude of the angle $\gamma$.

S70, if the traction rope 8 needs to wind around the fixed pulley 51, calculate, according to the predetermined $\alpha$ and $\gamma$, a position of the hoisting mechanism 31 relative to the connection point $O_1$ where the spiral anchor 7 is connected to the traction rope 8, and a position of the fixed pulley 51 on the cylinder 41 along the Z-axis direction, adjust the positions of the hoisting mechanism 31 and the fixed pulley 51 according to the calculated position data, and rotate the cylinder 41 correspondingly to make the vertical slit 411 face the hoisting mechanism 31; and if the traction rope 8 does not need to wind around the fixed pulley 51, calculate, according to the predetermined $\alpha$ and $\gamma$, a space relative coordinate position of the hoisting mechanism 31 relative to the connection point $O_1$ where the spiral anchor 7 is connected to the traction rope 8, and adjust the position of the hoisting mechanism 31 according to the obtained position data. The position of the fixed pulley 51 on the cylinder 41 along the Z-axis direction can be arbitrary.

Specifically, the hoisting mechanism 31 is simplified to a point O; when $\gamma$ is equal to 0, as shown in FIG. 9, the projection point of the coordinate point O of the hoisting mechanism 31 on the $XO_1Y$ plane coincides with the connection point $O_1$ where the spiral anchor 7 is connected to the traction rope 8, thus the space relative position coordinates of the coordinate point O of the hoisting mechanism 31 in the three-dimensional space coordinate system $O_1$-XYZ relative to the connection point $O_1$ where the spiral anchor 7 is connected to the traction rope 8 are (0, 0, H), where $H = h_2 + h_1 - h_3 + h_4$;

when $\gamma$ is greater than 0 and less than $\gamma'$, as shown in FIG. 8, the horizontal distance from the point O where the hoisting mechanism 31 is located to the connection point $O_1$ where the spiral anchor 7 is connected to the traction rope 8 is $L = H\tan\gamma$, thus the displacement of the coordinate point O of the hoisting mechanism 31 on the X axis relative to the connection point $O_1$ where the spiral anchor 7 is connected to the traction rope 8 is $X = L\cos\alpha = H\tan\gamma\cos\alpha$, and the displacement on the Y axis is $Y = L\sin\alpha = H\tan\gamma\sin\alpha$, and thus the space relative position coordinates of the coordinate point O of the hoisting mechanism 31 in the three-dimensional space coordinate system $O_1$-XYZ relative to the connection point $O_1$ where the spiral anchor 7 is connected to the traction rope 8 are $(H\tan\gamma\cos\alpha, H\tan\gamma\sin\alpha, H)$, where $H = h_2 + h_1\alpha h_3 + h_4$; and when $\gamma$ is greater than or equal to $\gamma'$ and less than or equal to 90°, as shown in FIG. 5 to FIG. 7, the vertical distance from the geometric center of the fixed pulley 51 to the upper edge of the cylinder 41 is:

$$h_c = h_2 - h_3 + h_4 - (t_{sb} + t_b + t_{bc})\cot\gamma - \frac{R}{\sin\gamma};$$

the length of the traction rope 8 from the connection point $O_1$ where the spiral anchor 7 is connected to the traction rope 8 to the tangent point of the fixed pulley 51 is:

$$L_a = \frac{t_{sb} + t_b + t_{bc}}{\sin\gamma} + R\cot\gamma;$$

the length of the traction rope 8 from the tangent point of the fixed pulley 51 to the hoisting mechanism 31 is:

$$L_b = \frac{h_1 + h_c}{\sin\gamma} + R\cot\theta_b;$$

thus, the displacement of the coordinate point O of the hoisting mechanism 31 on the X axis relative to the connection point $O_1$ where the spiral anchor 7 is connected to the traction rope 8 is:

$$X = (L_a \sin\gamma + L_b \cos\theta_b) \cos\alpha \text{ and}$$

the displacement of the coordinate point O of the hoisting mechanism 31 on the Y axis relative to the connection point $O_1$ where the spiral anchor 7 is connected to the traction rope 8 is:

$$Y = (L_a \sin\gamma + L_b \cos\theta_b) \sin\alpha$$

and thus, the relative position coordinates of the coordinate point O of the hoisting mechanism 31 in the three-dimensional space coordinate system $O_1$-XYZ relative to the connection point $O_1$ where the spiral anchor 7 is connected to the traction rope 8 are $((L_a\sin\gamma + L_b\cos\theta_b)\cos\alpha, (L_a\sin\gamma + L_b\cos\theta_b)\sin\alpha, H)$, where $H = h_2 + h_1 - h_3 + h_4$.

S80, according to the comparison result between the predetermined $\gamma$ and the critical angle $\gamma'$, connect the traction rope 8 to the spiral anchor 7 after the traction rope 8 is pulled out from the hoisting mechanism 31 and then winds around the fixed pulley 51, or directly connect the traction rope 8 to the spiral anchor 7 after the traction rope 8 is pulled out from the hoisting mechanism 31 and does not wind around the fixed pulley 51, and mount a force measuring device 9 on the traction rope 8.

S90, evenly fill the soil sample 6 into the cylinder 41, when the height that the soil sample 6 is filled is flush with the position of the pre-embedded depth $h_4$ of the connection point $O_1$ where the spiral anchor 7 is connected to the traction rope 8, determine an insertion point of the spiral anchor 7 on the surface of the soil sample 6 according to the pre-embedded horizontal distance $t_{sb}$ from the connection point $O_1$ where the spiral anchor 7 is connected to the traction rope 8 to the inner surface of the cylinder 41 along the X-axis direction, insert the spiral anchor 7 into the soil sample 6 from the insertion point according to the predetermined angles α and γ so that the spiral anchor 7 and the portion of the traction rope 8 adjacent to the spiral anchor 7 are coaxially arranged, and then continue the soil filling until the thickness of the soil sample 6 reaches an expected thickness.

Specifically, when the soil sample 6 is filled, the cylinder 41 is evenly filled with the soil sample 6 by using a flat-mouthed hourglass; during the filling process, the vertical slit 411 of the cylinder 41 is blocked by using a geotextile to prevent soil leakage during the filling of the soil sample 6 or the test; and in order to observe the deformation of the soil sample 6, the soil sample 6 is preferably transparent soil. In other embodiments, in order to better observe the deformation of the soil sample 6 , several colored sand layers may be arranged in the soil sample 6, and the colored sand layers are arranged at intervals along the central axis of the cylinder 41.

Before the spiral anchor 7 is placed in the soil sample 6, preliminary filling thicknesses $h_3$-$h_4$ of the soil sample 6 are obtained combined with the embedding depth $h_4$ of the spiral anchor 7 and the thickness $h_3$ of the soil sample 6 corresponding to the connection point $O_1$ where the spiral anchor 7 is connected to the traction rope 8 in the Z-axis direction. When the insertion point of the spiral anchor 7 is confirmed, the insertion point of the spiral anchor 7 and the center point of the cross section of the soil sample 6 corresponding to the insertion point are located on the X axis. It should be noted that in the process of filling the soil sample 6 and embedding the spiral anchor 7, the spiral anchor 7 can be completely embedded in the soil sample 6, or can be partially exposed on the upper surface of the soil sample 6.

In this embodiment, the expected thickness of the soil sample 6 in step 90 needs to be greater than or equal to the thickness, which is calculated in step S31, of the soil sample 6 corresponding to the highest point at the top of the soil sample 6 in the Z-axis direction.

S100, arrange the top of the soil sample 6 in a single inclined shape, and adjust the inclination of the top of the soil sample 6 according to the predetermined inclination angle β.

Figure 11:
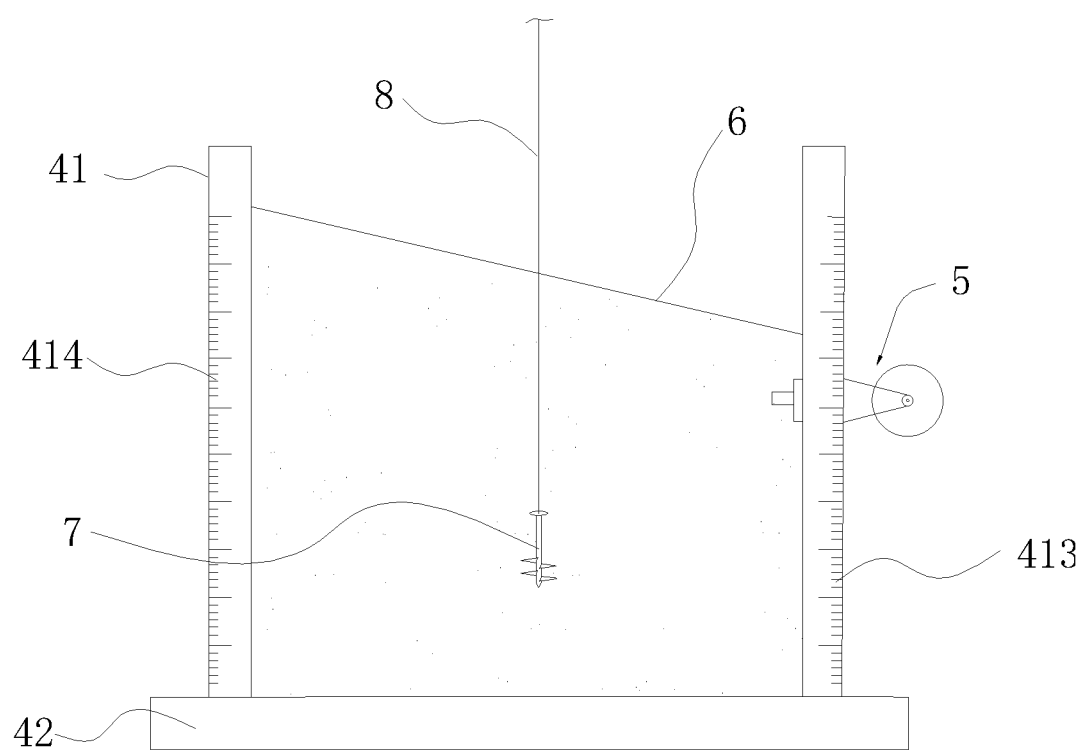
FIG. 11 is a structural schematic diagram of the assembly composed of the cylinder, the soil sample, the spiral anchor, and the pulley device in other embodiments.

Specifically, the top end of the soil sample 6 is cut according to the thickness of the soil sample 6 corresponding to the highest point at the top of the soil sample 6 in the Z-axis direction and the thickness of the soil sample 6 corresponding to the lowest point in the Z-axis direction until the top of the soil sample 6 is formed into a single inclined plane with the inclination angle (3, where the thicknesses mentioned above are calculated in step S90. In order to facilitate the precise cutting of the top of the soil sample 6 to a desired shape, in other embodiments, as shown in FIG. 11, a first scale line 413 and a second scale line 414 may be defined on opposite sides of the cylinder 41, respectively. When the cylinder device 4 is placed, the first scale line 413 is disposed close to the hoisting mechanism 31, and the second scale line 414 is disposed away from the hoisting mechanism. In the process of cutting, whether the thicknesses of the highest point and the lowest point at the top of the soil sample 6 in the Z-axis direction are up to standard is determined respectively by means of the first scale line 413 and the second scale line 414, and the lowest point is made to be close to the vertical slit 411, thereby preventing from the contact between the traction rope 8 and the top side of the soil sample 6, resulting in affecting the pulling result.

S110, start the hoisting mechanism 31 to carry out a test, read the pulling force of the traction rope 8 on the spiral anchor 7 by means of the force measuring device 9, and observe changes in the soil sample 6 at the same time.

Specifically, when changes in the soil sample 6 are observed, the deformation of the upper surface of the soil sample 6 during the winding process of the hoisting mechanism 31 is captured by the first cameras 101, the displacement of the upper surface of the soil sample 6 during the winding process of the hoisting mechanism 31 is captured by the laser displacement sensors 102, and the deformation of the peripheral surface of the soil sample 6 during the winding process of the hoisting mechanism 31 is captured by the second cameras 103.

S120, during the test, if the angle γ between the spiral anchor 7 and the Z axis and the angle a between the projection of the spiral anchor 7 on the $XO_1Y$ plane and the X axis change according to the test needs, remove the original soil sample 6 in the cylinder 41, modify the state of whether the traction rope 8 winds around the fixed pulley 51 according to the changed γ, and then execute step 50 and steps after step 50 according to the modified a and y, re-determined $t_{sb}$, $h_4$, $h_3$ and β, and $t_b$, $t_{bc}$, R, $h_1$, $h_2$ and $h_c$ measured in step S30, so as to carry out a new test.

By using the above-mentioned pullout resistance measuring device based on an anchor plate foundation of a submarine slope site, the pullout resistance measuring method based on an anchor plate foundation of a submarine slope site according to the present invention can reveal a damage mode of the spiral anchor 7 at different pulling space angles regarding the soil sample 6 in the submarine slope site and a pullout bearing capacity exerting mechanism, thereby achieving the purpose of guiding the project design of the spiral anchor 7.

In the present invention, the position of step S31 is not changeable, and can be arbitrarily exchanged before step 90 and after step S30. The position of step S30 is also not immutable, and can be placed before step S10, S20 or S40.

The above content is only preferred embodiments of the present invention. For those of ordinary skill in the art, there will be changes in the specific implementation and application scope according to the idea of the present invention. The content of this specification should not be construed as limiting the present invention.

What is claimed is:

1. A pullout resistance measuring device based on an anchor plate foundation of a submarine slope site, comprising a support, a moving beam, a hoisting mechanism, a cylinder device, a pulley assembly, a soil sample, a spiral anchor, a traction rope and a force measuring device, wherein the moving beam is mounted on the support and can move along a first horizontal direction relative to the support; the hoisting mechanism is mounted on the moving beam and can move, relative to the moving beam, along a second horizontal direction perpendicular to the first horizontal direction; the cylinder device comprises a cylinder with both open ends, and the side of the cylinder facing the hoisting mechanism is provided with a vertical slit; the pulley assembly is mounted on a side wall of the cylinder corresponding to the vertical slit and can move in a vertical direction relative to the cylinder, and the pulley assembly comprises a fixed pulley; the soil sample is filled in the cylinder, and the top of the soil sample is arranged in an inclined shape and composed of at least one inclined surface; the spiral anchor is buried in the soil sample; one end of the traction rope is connected to the hoisting mechanism, and the other end thereof is directly connected to the spiral anchor by running through the opening on the top of the cylinder, or connected to the spiral anchor after winding around the fixed pulley and running through the vertical slit; and a central axis of a portion of the traction rope adjacent to the spiral anchor is located on the same straight line as the center of the cross section of the spiral anchor, and the force measuring device is arranged on the traction rope;
  the hoisting mechanism is adsorbed and fixed on the moving beam by means of a hoisting magnetic part, and a length extension direction of the moving beam is the second horizontal direction;
  both ends of the moving beam are adsorbed and fixed on the support by means of beam magnetic parts; and
  the cylinder device further comprises a chassis arranged below the cylinder, a positioning groove is defined on the top of the chassis, and a bottom end of the cylinder is rotatably arranged in the positioning groove.

2. A pullout resistance measuring method based on an anchor plate foundation of a submarine slope site, wherein the method is on the basis of the pullout resistance measuring device based on an anchor plate foundation of a submarine slope site of claim 1, the top of a soil sample in the pullout resistance measuring device based on an anchor plate foundation of a submarine slope site is composed of at least one inclined surface, and the measuring method comprises the following steps:
  S10, assembling a support, and mounting the support on a test site;
  S20, mounting a moving beam on the support, and then mounting a hoisting mechanism on the moving beam;
  S30, establishing a three-dimensional geometric coordinate system $O_1$-XYZ by taking a connection point $O_1$ where a spiral anchor is connected to a traction rope as the origin, wherein an X-axis direction of the three-dimensional geometric coordinate system $O_1$-XYZ is parallel to a second horizontal direction along which the hoisting mechanism can move, a Y-axis direction is parallel to a first horizontal direction along which the moving beam can move, and a Z-axis direction is parallel to a central axis of a cylinder; determining an angle $\gamma$ between the spiral anchor and the Z axis, an angle a between the projection of the spiral anchor on the $XO_1Y$ plane and the X axis, a pre-embedded horizontal distance $t_{sb}$ from the connection point $O_1$ where the spiral anchor is connected to the traction rope to the inner surface of the cylinder along the X-axis direction, a pre-embedded depth $h_4$ of the spiral anchor, a thickness $h_3$ of the soil sample corresponding to the connection point where the spiral anchor is connected to the traction rope along the Z-axis direction, and an inclination angle $\beta$ of the top of the soil sample; and measuring a thickness $t_b$ of the cylinder, a horizontal distance $t_{bc}$ from the center of a fixed pulley to an outer surface of the cylinder, a radius R of the fixed pulley, a vertical distance $h_1$ from an upper edge of the cylinder to the hoisting mechanism, a height $h_2$ of the cylinder, and a vertical distance $h_c$ from a geometric center of the fixed pulley to the upper edge of the cylinder;
  S40, placing a cylinder device defined with a vertical slit and mounted with a pulley assembly on the position of a predetermined test site, wherein the cylinder of the cylinder device is made of transparent material;
  S50, calculating whether the traction rope winds around a critical angle $\gamma'$ of the fixed pulley, wherein the calculation formula of $\gamma'$ is as follows:

$$\gamma' = \frac{\pi}{2} - \arcsin\left[\frac{R}{\frac{L(h_2 + h_1 - h_3 - R)}{h_1 + h_2 + h_4 - h_3} - (t_{sb} + t_b + t_{bc})}\right];$$

S60, comparing the predetermined y with the calculated critical angle $\gamma'$, and determining whether the traction rope needs to wind around the fixed pulley;
  S70, if the traction rope needs to wind around the fixed pulley, calculating, according to the predetermined α and $\gamma$, a position of the hoisting mechanism relative to the connection point $O_1$ where the spiral anchor is connected to the traction rope, and a position of the fixed pulley on the cylinder along the Z-axis direction, adjusting the positions of the hoisting mechanism and the fixed pulley according to the calculated position data, and rotating the cylinder correspondingly to make the vertical slit face the hoisting mechanism; and if the traction rope does not need to wind around the fixed pulley, calculating, according to the predetermined α and $\gamma$, a space relative coordinate position of the hoisting mechanism relative to the connection point $O_1$ where the spiral anchor is connected to the traction rope, and adjusting the position of the hoisting mechanism according to the obtained position data;
  S80, according to the comparison result between the predetermined $\gamma$ and the critical angle $\gamma'$, connecting the traction rope to the spiral anchor after the traction rope is pulled out from the hoisting mechanism and then winds around the fixed pulley, or directly connecting the traction rope to the spiral anchor after the traction rope is pulled out from the hoisting mechanism and does not wind around the fixed pulley, and mounting a force measuring device on the traction rope;
  S90, evenly filling the soil sample into the cylinder, when the height that the soil sample is filled is flush with the position of the pre-embedded depth $h_4$ of the connection point $O_1$ where the spiral anchor is connected to the traction rope, determining an insertion point of the spiral anchor on the surface of the soil sample according to the pre-embedded horizontal distance $t_{sb}$ from the connection point $O_1$ where the spiral anchor is connected to the traction rope to the inner surface of the cylinder along the X-axis direction, inserting the spiral anchor into the soil sample from the insertion point, and then continuing the soil filling until the thickness of the soil sample reaches an expected thickness;
  S100, arranging the top of the soil sample in a single inclined shape, and adjusting the inclination of the top of the soil sample according to the predetermined inclination angle $\beta$; and
  S110, starting the hoisting mechanism to carry out a test, reading the pullout resistance of the traction rope on the spiral anchor by means of the force measuring device, and observing changes in the soil sample at the same time.

3. The pullout resistance measuring method based on an anchor plate foundation of a submarine slope site of claim 2, after step S110, further comprising step S120: during the test, if the angle γ between the spiral anchor and the Z axis and the angle α between the projection of the spiral anchor on the $XO_1Y$ plane and the X axis change according to the test needs, removing the original soil sample in the cylinder, modifying the state of whether the traction rope winds around the fixed pulley according to the changed γ, and then executing step S50 and steps after step S50 according to the modified α and γ, re-determined $t_{sb}$, $h_4$, $h_3$ and β, and $t_b$, $t_{bc}$, R, $h_1$, $h_2$ and $h_c$ measured in step S30, so as to carry out a new test.

4. The pullout resistance measuring method based on an anchor plate foundation of a submarine slope site of claim 2, wherein in step S60:

if γ is greater than 0 and less than γ′, the traction rope does not need to wind around the fixed pulley, and the position of the fixed pulley on the cylinder is arbitrary; and if γ is greater than or equal to γ′ and less than or equal to 90°, the traction rope needs to wind around the fixed pulley, and the position of the fixed pulley on the cylinder along the Z-axis direction is correspondingly adjusted according to the magnitude of the angle γ.

5. The pullout resistance measuring method based on an anchor plate foundation of a submarine slope site of claim 2, wherein in step S70, the calculation of space relative position coordinates of the hoisting mechanism in the three-dimensional space coordinate system $O_1$-XYZ relative to the connection point $O_1$ where the spiral anchor is connected to the traction rope specifically involves:

the hoisting mechanism is simplified to a point O;

when y is equal to 0, the projection point of the coordinate point O of the hoisting mechanism on the $XO_1Y$ plane coincides with the connection point $O_1$ where the spiral anchor is connected to the traction rope, thus the space relative position coordinates of the coordinate point O of the hoisting mechanism in the three-dimensional space coordinate system $O_1$-XYZ relative to the connection point $O_1$ where the spiral anchor is connected to the traction rope are (0, 0, H), where $H = h_2 + h_1 - h_3 + h_4;$ when γ is greater than 0 and less than γ′, the horizontal distance from the point O where the hoisting mechanism is located to the connection point $O_1$ where the spiral anchor is connected to the traction rope is L=Htanγ, thus the displacement of the coordinate point O of the hoisting mechanism on the X axis relative to the connection point $O_1$ where the spiral anchor is connected to the traction rope is X=Lcosα=Htanγcosα and the displacement on the Y axis is Y=Lsinα=Htanγsinα, and thus the space relative position coordinates of the coordinate point O of the hoisting mechanism in the three-dimensional space coordinate system $O_1$-XYZ relative to the connection point $O_1$ where the spiral anchor is connected to the traction rope are (Htanγcosα, Htanγsinα, H) , where $H=h_2+h_1-h_3+h_4$; and when γ is greater than or equal to γ′ and less than or equal to 90°, the vertical distance from the geometric center of the fixed pulley to the upper edge of the cylinder is:

$$h_c = h_2 - h_3 + h_4 - (t_{sb} + t_b + t_{bc})\cot\gamma - \frac{R}{\sin\gamma};$$

the length of the traction rope from the connection point $O_1$ where the spiral anchor is connected to the traction rope to the tangent point of the fixed pulley is:

$$L_a = \frac{t_{sb} + t_b + t_{bc}}{\sin\gamma} + R\cot\gamma;$$

the length of the traction rope from the tangent point of the fixed pulley to the hoisting mechanism is:

$$L_b = \frac{h_1 + h_c}{\sin\gamma} + R\cot\theta_b;$$

thus, the displacement of the coordinate point O of the hoisting mechanism on the X axis relative to the connection point $O_1$ where the spiral anchor is connected to the traction rope is:

$X = (L_a \sin\gamma + L_b \cos\theta_b) \cos\alpha$, and the displacement of the coordinate point O of the hoisting mechanism on the Y axis relative to the connection point $O_1$ where the spiral anchor is connected to the traction rope is:

$Y = (L_a \sin\gamma + L_b \cos\theta_b) \sin\alpha$, and thus, the relative position coordinates of the coordinate point O of the hoisting mechanism in the three-dimensional space coordinate system $O_1$-XYZ relative to the connection point $O_1$ where the spiral anchor is connected to the traction rope are (($L_a\sin\gamma+L_b\cos\theta_b$) cosα, ($L_a\sin\gamma+L_b\cos\theta_b$) sinα, H), where $H=h_2+h_1-h_3+h_4$.

6. The pullout resistance measuring method based on an anchor plate foundation of a submarine slope site of claim 2, prior to step S90, further comprising the step of: calculating the thicknesses of the soil sample respectively corresponding to the highest point and the lowest point at the top of the soil sample in the Z-axis direction by combining the measured inner diameter $R_1$ of the cylinder and the pre-embedded horizontal distance $t_{sb}$, which is determined before the test, from the connection point $O_1$ where the spiral anchor is connected to the traction rope to the inner surface of the cylinder along the X-axis direction, the inclination angle β of the top of the soil sample, and the thickness $h_3$ of the soil sample corresponding to the connection point $O_1$ where the spiral anchor is connected to the traction rope in the Z-axis direction;

in step S90, the expected thickness of the soil sample needs to be greater than or equal to the calculated thickness of the soil sample corresponding to the highest point at the top of the soil sample in the Z-axis direction; and in step S100, the top end of the soil sample is cut according to the calculated thicknesses of the soil sample respectively corresponding to the highest point and the lowest point at the top of the soil sample in the Z-axis direction until the top of the soil sample is formed into a single inclined plane with the inclination angle β.

\* \* \* \* \*